United States Patent [19]

Imaseki et al.

[11] Patent Number: 5,075,854
[45] Date of Patent: Dec. 24, 1991

[54] DIFFERENTIAL LIMITING FORCE CONTROL SYSTEM RESPONSIVE TO VEHICLE SPEED AND STEERING ANGLE

[75] Inventors: Takashi Imaseki; Yuji Kobari, both of Zushi, Japan

[73] Assignee: Nissan Motor Co., Ltd., Yokohama, Japan

[21] Appl. No.: 565,207

[22] Filed: Aug. 9, 1990

Related U.S. Application Data

[63] Continuation of Ser. No. 255,934, Oct. 11, 1988, abandoned.

[30] Foreign Application Priority Data

Oct. 9, 1987 [JP] Japan .................. 62-255747

[51] Int. Cl.$^5$ ............... B60K 17/20; F16H 37/08
[52] U.S. Cl. ................ 364/424.05; 364/426.01; 364/424.1; 74/810.1; 74/810.2; 180/248; 180/79.1
[58] Field of Search ........... 364/424.05, 426.01, 364/426.03, 424.1; 74/710, 710.5, 711, 713; 180/248, 79.1, 197

[56] References Cited

U.S. PATENT DOCUMENTS

| | | | |
|---|---|---|---|
| 4,012,968 | 3/1977 | Kelbel | 74/711 |
| 4,417,641 | 11/1983 | Kageyama | 180/247 |
| 4,511,014 | 4/1985 | Makita | 180/233 |
| 4,566,554 | 1/1986 | Suzuki | 180/249 |
| 4,679,463 | 7/1987 | Ozaki et al. | 74/711 |
| 4,720,791 | 1/1988 | Daido | 364/424.05 |
| 4,754,834 | 7/1988 | Ozaki et al. | 180/233 |
| 4,779,202 | 10/1988 | Leiber | 364/426.03 |
| 4,779,696 | 10/1988 | Harada et al. | 364/426.01 |
| 4,790,404 | 12/1988 | Naito | 74/710.5 |
| 4,813,297 | 3/1989 | Azuma et al. | 74/675 |
| 4,819,512 | 4/1989 | Azuma et al. | 74/713 |

FOREIGN PATENT DOCUMENTS

| | | |
|---|---|---|
| 43237 | 1/1982 | European Pat. Off. . |
| 0128477 | 6/1984 | European Pat. Off. . |
| 0236694 | 1/1987 | European Pat. Off. . |
| 0237147 | 9/1987 | European Pat. Off. . |
| 60-53430 | 3/1985 | Japan . |
| 61-67629 | 4/1986 | Japan . |
| 61-102320 | 5/1986 | Japan . |
| 61-157437 | 7/1986 | Japan . |
| 61-178233 | 8/1986 | Japan . |
| 62-103226 | 5/1987 | Japan . |
| 62-103227 | 5/1987 | Japan . |
| 797921 | 4/1979 | U.S.S.R. . |
| 2192159 | 1/1988 | United Kingdom . |

Primary Examiner—Parshotam S. Lall
Assistant Examiner—V. N. Trans
Attorney, Agent, or Firm—Foley & Lardner

[57] ABSTRACT

A differential limiting force control system for controlling a slip limiting force by controlling an engagement force of a clutch assembly of a limited slip differential provided between left and right drive wheels of a vehicle includes a control unit having a basic control section for increasing the differential limiting force with increase of a vehicle speed, and an adjusting section for decreasing the differential limiting force when a steering angle is equal to or lower than a predetermined angle, or when a steering angular speed is equal to or higher than a predetermined angle.

16 Claims, 12 Drawing Sheets

DIFFERENTIAL LIMITING FORCE CONTROL SYSTEM RESPONSIVE TO VEHICLE SPEED AND STEERING ANGLE

This application is a continuation of application Ser. No. 07/255,934, filed Oct. 11, 1988 now abandoned.

REFERENCES TO RELATED APPLICATIONS

The following, commonly assigned U.S. patent applications relate to differential limiting systems. (1) Ser. No. unknown, corresponding to Japanese patent application No. 62-245685, Our ref. U056-88, (2) Ser. No. unknown, corresponding to Japanese application No. 62-245,684, Our ref. U059-88, (3) Ser. No. unknown, corresponding to Japanese Utility Modle applications Nos. 62-184485 and 62-169964, Our ref. U131-88, (4) Ser. No. unknown, corresponding to Japanese patent applications Nos. 62-259038 and 62-312489, Our ref. U134-88, (5) Ser. No. unknown, corresponding to Japanese patent application No. 62-264525, Our ref. U139-88, (5) Ser. No. unknown, corresponding to Japanese patent application No. 62-249200, Our ref. U140-88.

BACKGROUND OF THE INVENTION

The present invention relates to a differential limiting (or slip limiting) system capable of actively controlling a differential limiting action to a rotational speed difference between left and right drive wheels in accordance with a control signal.

One conventional example is shown in Japanse patent provisional publication No. 61-67629. This conventional control system includes a vehicle speed sensing means, and a controlling means for controlling a fluid pressure in accordance with the vehicle speed, and is arranged to control an engagement force (that is, a differential limiting force) of a friction clutch disposed between a differential case of a side gear by controlling the fluid pressure supplied to the friction clutch.

However, this conventional control system is arranged to increase the engagement force of the friction clutch when the vehicle speed becomes higher, and to decrease the clutch engagement force when the vehicle speed becomes lower. Therefore, when the driver changes the course of the vehicle from one lane to another at high vehicle speeds, an undermoment due to the differential limiting action is produced at the start of the turning operation of the steering wheel, so that the vehicle response is degraded. As shown in FIG. 14, the undermoment is produced when the direction M' of a moment due to the differential limiting action is opposite to a turning direction M of the vehicle. As shown in FIG. 15, an overmoment is produced when both directions M and M' are the same.

SUMMARY OF THE INVENTION

It is, therefore, an object of the present invention to provide a differential limiting force control system which can prevent an undesired decrease of the vehicle response by controlling the differential limiting force in accordance with the vehicle speed, and simultaneously by decreasing the differential limiting force when a steering angle is smaller than a predetermined angle, or when a steering angular speed is higher than a predetermined angular speed value.

As shown in FIG. 1, according to the present invention, a differential limiting force control system comprises a differential mechanism, vehicle speed sensing means, steering condition sensing means, command value determining means, controlling means, and adjusting means.

The differential mechanism is provided between left and right drive wheels of the vehicle, and comprises means for limiting a differential action in accordance with a control signal. The vehicle sensing means senses a vehicle speed of the vehicle, and produces a first signal representing the vehicle speed. The steering condition sensing means senses a steering condition of the vehicle, and produces a second signal representing the steering condition.

The determining means determines a command value in accordance with the first signal. The controlling means produces the control signal in accordance with the command value. The adjusting means decreases the command value when the second signal is in a predetermined condition. Preferably, the adjusting means is arranged to decrease the command value when a steering angle is equal to or smaller than a predetermined angle, or when a steering angular speed is equal to or higher than a predetermined angular speed.

Therefore, the controlling means makes the differential limiting force equal to a value corresponding to the command value. For example, the controlling means controls the differential limiting force so that the differential limiting force is proportional to the command value.

The control system decreases the undermoment due to the differential limiting action, and improve the response of the vehicle by decreasing the differential limiting force when the steering wheel angle is smaller than the predetermined angle, or when the steering angular speed is higher than the predetermined angular speed.

DETAILED DESCRIPTION OF THE INVENTION

A first embodiment of the present invention is shown in FIGS. 2-7.

Figure 1:
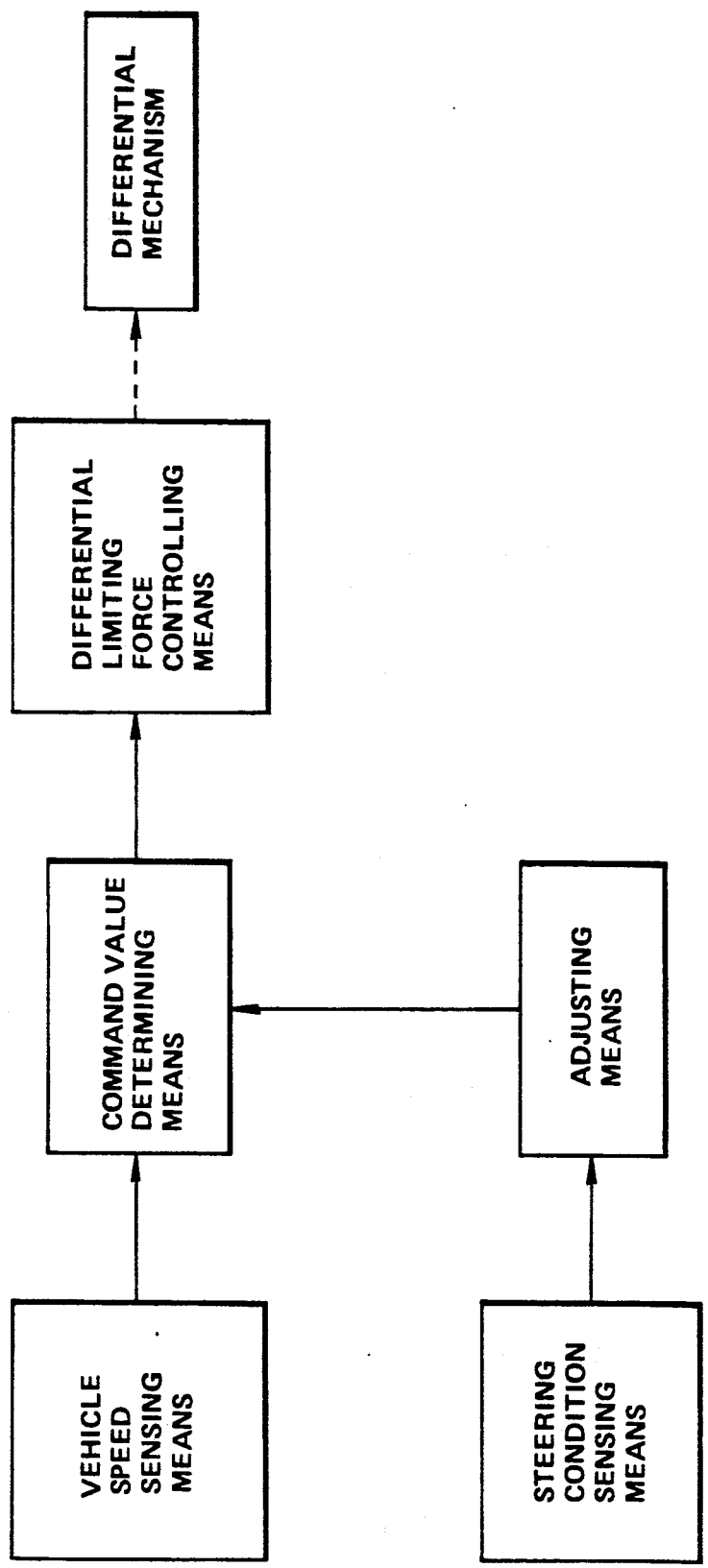
FIG. 1 is a block diagram showing a basic arrangement of a differential limiting force control system of the present invention.
Figure 2:
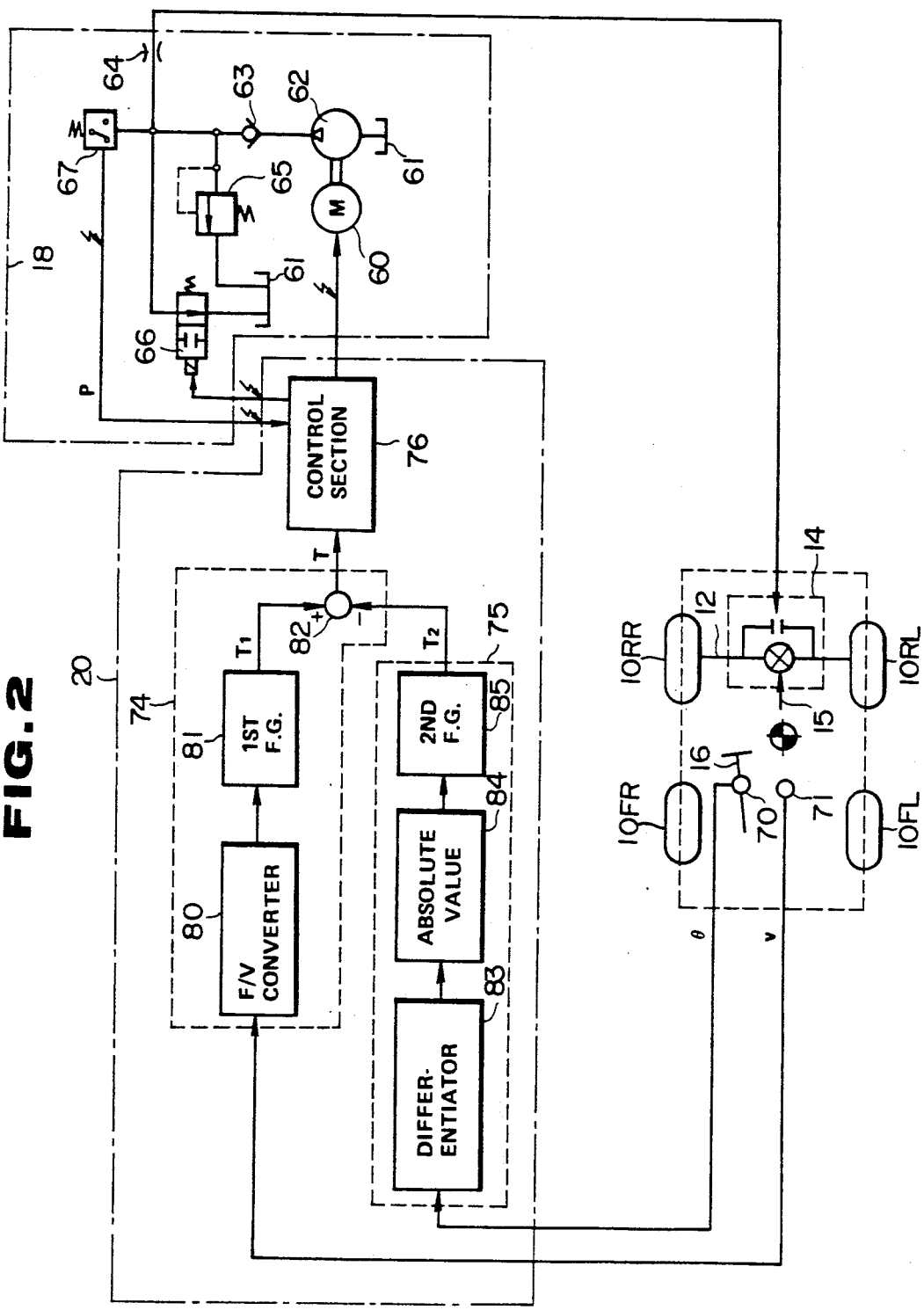
FIG. 2 is a schematic view showing a differential limiting force control system according to a first embodiment of the present invention.

As shown in FIG. 2, a vehicle has front wheels 10FL and 10FR, rear wheels 10RL and 10RR, a rear wheel drive axle 12, a limited slip differential 14 disposed in the rear wheel drive axle 12, a propeller shaft 15, a steering shaft 16, an oil pressure source 18 for supplying an oil pressure to a differential limiting device of the limited slip differential 14, and a controller 20 for controlling the oil pressure of the pressure source 18.

Figure 3:
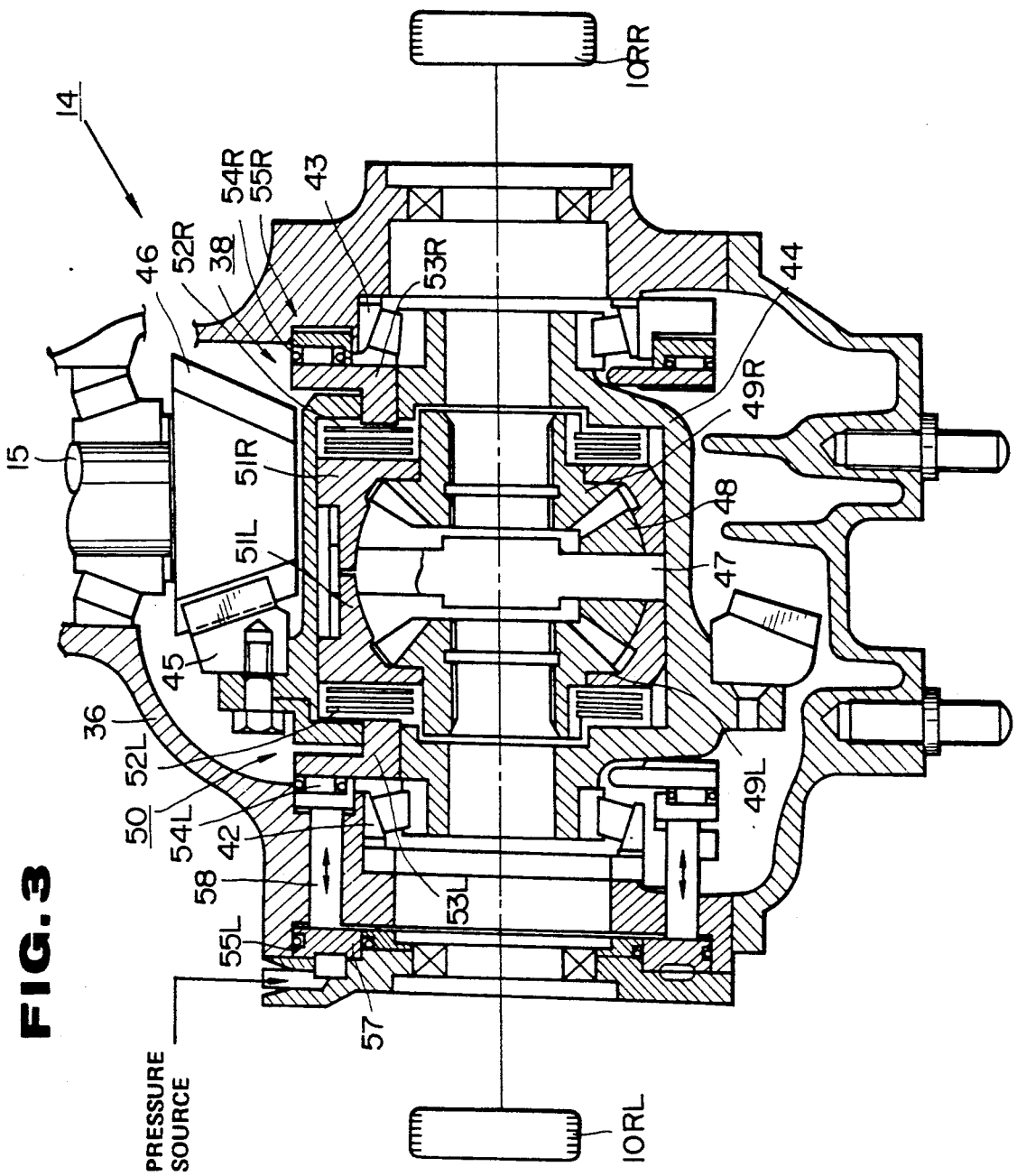
FIG. 3 is a sectional view showing a differential used in the first embodiment.

FIG. 3 shows the differential 14. U.S. Pat. No. 4,679,463 discloses a differential of the same type. The disclosure of this patent is herein incorporated by reference. The differential 14 has a differential mechanism 38 enclosed in a housing 36. A differential gear case 44 is rotatably supported by bearings 42 and 43 in the housing 36. A final gear 45 is fixed to the differential gear case 44. The final gear 45 is in engagement with a drive pinion gear 46 mounted on the rear end of the propeller shaft 15.

Pinion gears 48 are rotatably supported by a pinion mate shaft 47 to the differential gear case 44. The pinion gears 48 are in engagement with left and right side gears 49L and 49R. The left side gear 49L is splined to an inner end of a left drive axle shaft of the axle 12, whose outer end is connected with the rear left drive wheel 10RL. The right side gear 49R is connected to the rear right drive wheel 10RR by a right drive axle shaft in the same manner.

A differential limiting (or slip limiting) mechanism 50 is provided in the differential gear case 44. The differential limiting mechanism 50 has left and right pressure rings 51L and 51R, which are rotatably mounted on the side gears 49L and 49R, respectively, and which have wedge-shaped notches receiving the pinion mate shaft 47. The differential limiting mechanism 50 further includes left and right friction clutches 52L and 52R provided between the differential gear case 44 and the side gears 49L, 49R, left and right pressure levers 53L and 53R for providing preload to the friction clutches 52L and 52R, and left and right cylinder portions 55L and 55R for moving the pressure levers 53L and 53R back and forth through bearings 54L and 54R, respectively. The left cylinder portion 55L is formed in a left end of the housing 36, and has a piston 57 which is connected with the pressure lever 53L through a piston rod 58 passing through the housing 36.

As shown in FIG. 2, the pressure source 18 has an oil pressure pump 62 driven by a motor 60. The motor 60 is controlled by the controller 20. An inlet side of the pump 62 is connected with a reservoir tank 61. An outlet side of the pump 62 is connected to the cylinder portions 55L and 55R of the differential limiting mechanism 50 through a check valve 63 and an orifice 64. A relief valve 65 is provided so that an upper limit value of the outlet pressure of the pump 62 is set by the relief valve 65. An electromagnetic opening and closing valve 66 controlled by the controller 20 is disposed in parallel to the pump 62 and the check valve 63. By closing the electromagnetic valve 66, the controller 20 applies the output oil pressure of the pump 62 to the cylinder portions 55L and 55R of the differential limiting mechanism 50, and thereby puts the differential limiting mechanism 50 to an operative state. By opening the electromagnetic valve 66, the controller 20 shuts off the supply of the outlet pressure of the pump 62 to the differential limiting mechanism 50, and puts the differential limiting mechanism 50 into an inoperative state. Between the check valve 63 and the orifice 64, there is provided a pressure switch 67 for producing an output signal of a logical value "1" at a predetermined preset pressure.

Figure 4:
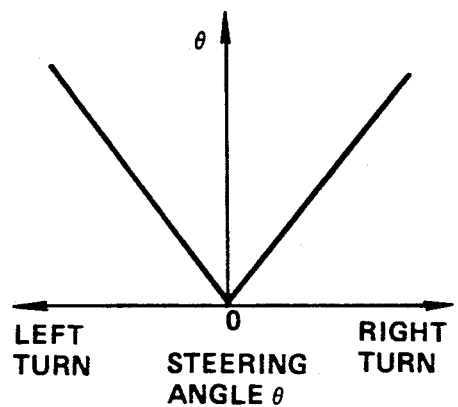
FIG. 4 is a graph showing an output characteristic of a steering angle sensor used in the first embodiment.

A steering angle sensor 70 is provided in the steering shaft 16. The steering angle sensor 70 produces a steering angle signal $\theta$ of a positive analog voltage, representing a steering wheel angle. As shown in FIG. 4, the steering angle $\theta$ is zero when the steering wheel is in the neutral position. As the steering wheel is turned leftwardly or rightwardly away from the neutral position, the steering angle $\theta$ increases linearly. The steering angle signal $\theta$ is sent to the controller 20.

A vehicle speed sensor 71 is disposed at a predetermined position of the vehicle body. The vehicle speed sensor 71 of this embodiment is arranged to optically detect a rotational speed on the output side of the transmission of the vehicle. The vehicle speed sensor 71 produces a vehicle speed pulse signal v corresponding to a vehicle speed V, and sends this vehicle speed signal to the controller 20.

As shown in FIG. 2, the controller 20 includes a command value determining section 74, a command value adjusting section 75, and an oil pressure controlling section 76 for controlling the output pressure of the oil pressure source 18 in accordance with a command value T determined by the command value determining section 74.

The command value determining section 74 includes a frequency-to-voltage converter 80 for converting the vehicle speed signal v of the vehicle speed sensor 71 into an analog voltage veicle signal v, a first function generator 81 for producing a first command value $T_1$ corresponding to the vehicle speed signal v, and an adder 82 for determining a final command value T which is an algebraic sum of the first command value $T_1$ with the plus sign, and a second command value $T_2$ with the minus sign ($T = T_1 - T_2$). The final command value T is sent to the oil pressure controlling section 76.

The command value adjusting section 75 includes a differentiating circuit 83 for determining a steering angular signal $\dot{\theta}$ by differentiating the steering angle signal $\theta$ of the steering angle sensor 70, an absolute value circuit 29 for determining the absolute value of the derivative $\dot{\theta}$ of the sdteering angle $\dot{\theta}$, and a second function generator 85 producing the second command value $T_2$ corresponding to the absolute value $|\dot{\theta}|$ determined by the absolute value circuit 84.

Figure 5:
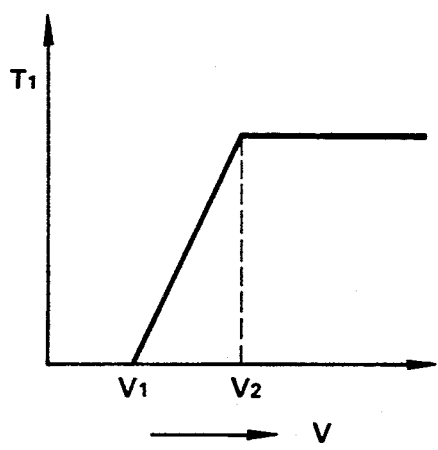
FIG. 5 is a graph showing an output characteristic of a first function generator shown in FIG. 2.

The first function generator 81 has a characteristic shown in FIG. 5. When the vehicle speed V is lower than a predetermined first speed value $V_1$ (30 kem/h, for example), the first command value $T_1$ is held equal to zero. As the vehicle speed V increases from the first speed value $V_1$ to a second predetermined speed value $V_2$ (50 km/h, for example), the first command value $T_1$ increases linearly from zero to a limit value. When the vehicle speed V is higher than the second speed value $V_2$, the first command value $T_1$ is held equal to the constant limit value.

Figure 6:
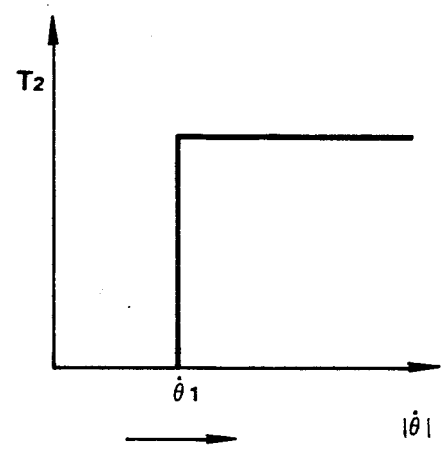
FIG. 6 is a graph showing an output characteristic of a second function generator shown in FIG. 2.

The second function generator 85 has a characteristic shown in FIG. 6. The second command value $T_2$ rieses abruptly like a step change when the absolute value of the steering angular speed $\dot{\theta}$ exceeds a predetermined angular speed value $\dot{\theta}_1$ (45 deg/sec, for example). The second command value $T_2$ is held equal to zero when the absolute value of the time rate of change of the steering angle $\theta$ is lower than the predetermined angular speed value $\dot{\theta}_1$. The second command value $T_2$ is held equal to a predetermined constant value when the absolute value of the rate of change of the steering angle $\theta$ is higher than the predetermined angular speed value $\dot{\theta}_1$.

The pressure controlling section 76 is composed of a microcomputer including an interface circuit, a processing unit, and a memory section having RAM and ROM. The pressure controlling section 76 receives the final command value T from the command value determining section 74, and controls the motor 60 and the electromagnetic valve 66 to control the differential limiting force of the differential limiting mechanism 50 in accordance with the final command value T.

When the final command value T commands the operation of the differential limiting mechanism 50, then the pressure controlling section 76 drives the motor 60 at a controlled duty ratio by using a switch signal of the pressure switch 67 as a feedback signal so as to obtain the differential limiting force commanded by the final command value T, and provides the preload of a predetermined pressure, that is the differential limiting force, to the friction clutches 52L and 52R of the differential limiting mechanism 50. In this way, the pressure controlling section 76 of the controller 20 controls the differential limiting force of the differential limiting mechanism 50 in accordance with the final command value T.

When the final command value T is zero, and commands the differential limiting mechanism 50 to be inoperative, the pressure controlling section 76 puts the electromagnetic valve 66 in its open position, and causes the outlet pressure of the pump 62 to return to the reservoir tank 61. Therefore, the preload to the friction clutches 52L and 52R is cancelled, and the differential limiting force is removed.

The control system of the first embodiment operates as follows:

When the vehicle is in a straight ahead movement with the steering wheel at the neutral position, the rotational speed difference between the left and right wheels is zero, and the differential mechanism 36 transmits the rotational driving force from the transmission to the drive wheels 10RL and 10RR through the drive axle 12. The driving force (or torque) transmitted from the transmission through the propeller shaft 15 is further transmitted to the differential gear case 44 through the drive pinion gear 46 and the final gear 45, and then to the side gears 49L and 49R through the pinion mate shaft 47 and the pinions 48. Finally, the driving force is transmitted from the side gears 49L and 49R to the drive wheels 10RL and 10RR through the drive axle 12.

In this case, the command value determining section 74 determines the first command value $T_1$ with the first function generator 81, in accordance with the vehicle speed signal v supplied from the vehicle speed sensor 71. If the vehicle speed V is lower than the predetermined first speed value $V_1$ of the first function generator 81, then the first command value $T_1$ is equal to zero ($T_1=0$). In this driving condition, the command value adjusting section 75 holds the second command value $T_2$ equal to zero ($T_2=0$) because the steering angle is almost zero. Therefore, the final command value T outputted from the command value determining section 74 is equal to $T_1$ ($T=T_1=0$). If the vehicle speed V is higher than the first speed value $V_1$, then the first command value $T_1$ is greater than zero, and the final command value T is equal to $T_1$.

When the final command value T is equal to $T_1$ greater than zero, the pressure controlling section 76 performs the duty factor control of the motor 60, and supplies the oil pressure corresponding to the final command value T to the cylinder portions 55L and 55R of the differential limiting mechanism 50 to apply the preload to the friction clutches 52L and 52R. When the first command value $T_1$ is zero, and accordingly the final command value T is zero, then the pressure controlling section 76 provides no preload to the friction clutches 52L and 52R. In either case, the differential gear case 44, and the side gears 49L and 49R rotate at the same speed because the vehicle is moving straight ahead. Therefore, the pressure rings 51L and 51R are not pushed outwardly by the pinion mate shaft 47, and the differential limiting mechanism 50 remains in the inoperative state.

If the steering wheel is turned from the neutral position to the right, for example, at a relatively low steering angular speed lower than the predetermined angular speed value $\dot{\theta}_1$ ($|\dot{\theta}|<\dot{\theta}_1$) at the vehicle speed V higher than the predetermined second speed value $V_2$ ($V>V_2$), then the first function generator 81 determines the first command value $T_1$ in accordance with the vehicle speed V, and simultaneously the steering angle signal $\theta$ representing the angular displacement of the steering wheel is sent from the steering angle sensor 70 to the command adjusting section 75. The second function generator 85 of the command value adjusting section 75 determines the second command value $T_2$ corresponding to the absolute value $|\dot{\theta}|$ of the angular speed of the steering wheel. In this condition, the second command value $T_2$ is zero because of the low angular speed of the steering wheel, and the final command value T is equal to the first command value $T_1$ ($T=T_1$).

Figure 14:
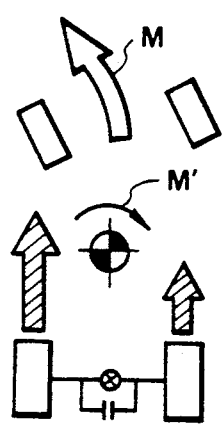
FIG. 14 is a view for illustrating the undermoment.

Therefore, the pressure controlling section 76 holds the electromagnetic valve 66 in the closed position, and supplies the preload proportional to the final command value T which is equal to $T_1$ ($T=T_1$), to the friction clutches 52L and 52R of the differential limiting mechanism 50. Because the vehicle is turning rightwardly, the left drive wheel 10RL on the outside of the turn rotates faster than the inside right wheel 10RR at the early stage of the turn. In this state, the pressure rings 51L and 51R move outwardly by the effect of wedge, and friction torque is produced in the frictions clutches 52L and 52R. Therefore, the torque of the faster side gear 49L is decreased, and the torque which is taken away from the faster side gear 49L is transmitted to the slower side gear 49L through the differential gear case 44, so that the torque of the slower side gear 49R is increased. As a result, the undermoment (shown in FIG. 14) due to the differential limiting force is produced temporarily, and the control system acts to settle the rolling of the vehicle.

Figure 15:
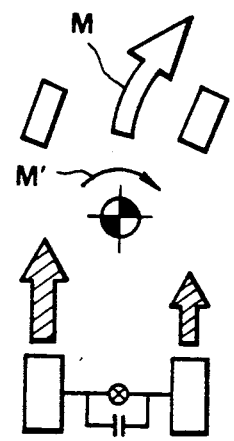
FIG. 15 is a view for illustrating the overmoment.

When the right turn further proceeds, the right drive wheel 10RR tends to rise free of the road surface by the influence of the lateral acceleration of the vehicle, and the road resistance to the right drive wheel 10RR is decreased. Therefore, the speed of the right drive wheel is increased, and the torque transmitted to the right drive wheel is decreased. In this state, the above-mentioned differential limiting operation is effected oppositely, and the torque taken away from the right drive wheel 10RR is transmitted to the left drive wheel 10RL. Therefore, the torque on the left wheel's side is made higher, and the overmoment shown in FIG. 15 is produced. In this way, this control system ensures the superior response characteristic of the vehicle.

If the steering wheel is turned to the right from the neutral position at a relatively high steering angular speed equal to or higher than the predetermined value $\dot{\theta}_1 (|\dot{\theta}| \geq \dot{\theta}_1)$ at the vehicle speed V higher than $V_2$ (such a rapid steering operation is used at the start of a lane change at relatively high vehicle speeds, for example), then the second command value $T_2$ is greater than zero, and the final command value T becomes equal to $T_1 - T_2$. Therefore, the control system decreases the preload provided to the differential limiting mechanism 50, i.e. the differential limiting force, by the amount equal to $T_2$, and decreases the undermoment due to the differential limiting force, so that the control system can improve the controllability of the vehicle by preventing a decrease of the steering response characteristic. When the absolute value of the steering angular velocity becomes lower than the predetermined value ($|\dot{\theta}| < \dot{\theta}_1$) after the rapid steering operation, the second command value $T_2$ becomes zero, and the control system ensures the satissfactory vehicle behavior by applying the differential limiting force.

When the steering wheel is turned leftwardly from the neutral position at the vehicle speed V lower than the second speed value $V_2$, the final command value T determined by the adder 82 becomes equal to or lower than zero ($T \leq 0$). However, the preload produced by the pressure source 18 does not decreases below zero, and the differential limiting mechanism 50 is put in the inoperative state, so that only the differential mechanism 36 is in operation independently of the steering angular speed. Thus, the differential mechanism 36 absorbs the rotational speed difference between the drive wheels 10RL and 10RR by the rotation of the pinions 48, and the transmission torques of the left and right side gears 49L and 49R are equal to each other.

When the steering wheel is turned to the left from the neutral position, the control system is operated in the same manner, and improves the response of the vehicle espeically when the angular speed of the steering weel is high.

Figure 7:
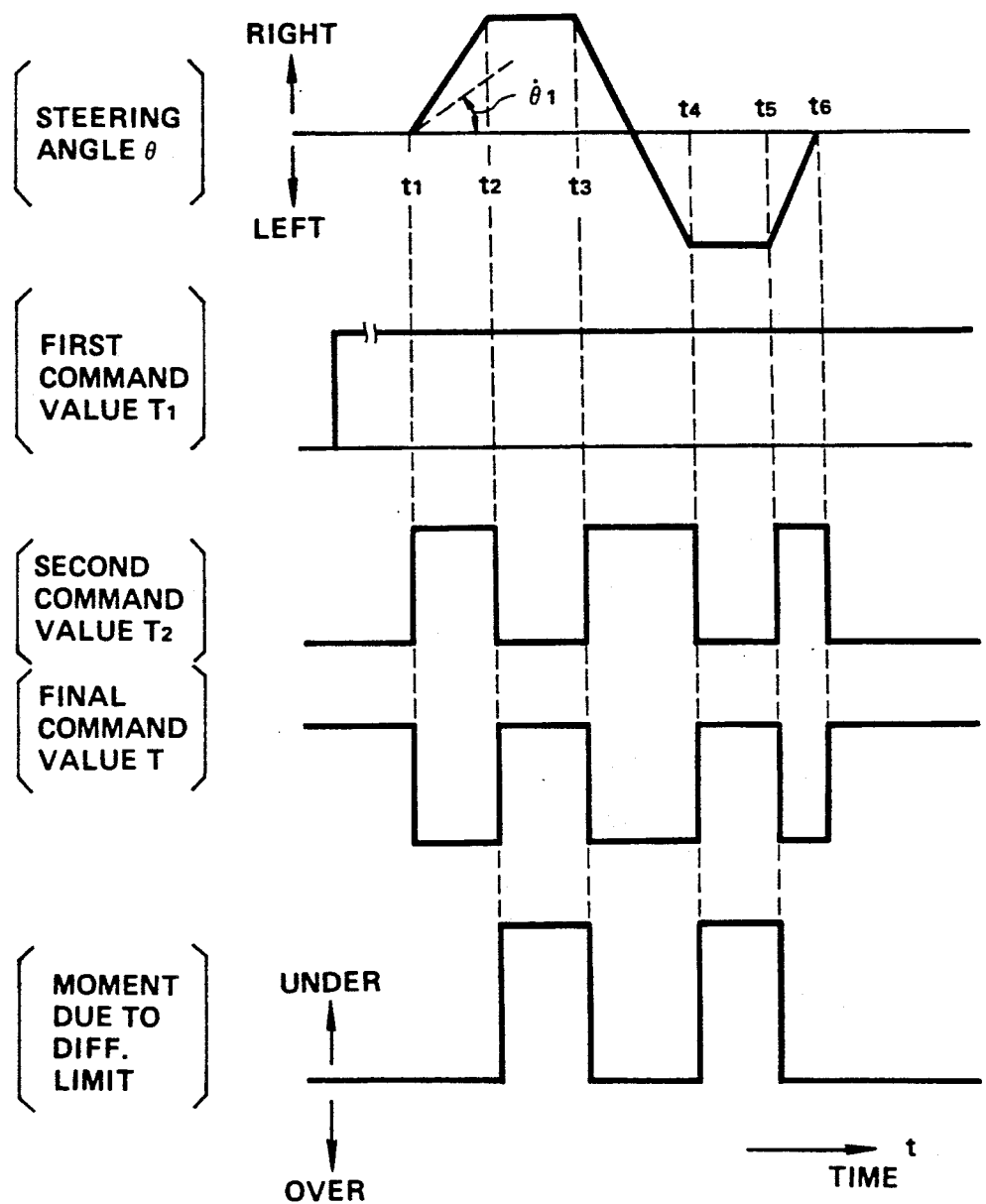
FIG. 7 a time chart showing operations of the control system of the first embodiment.

FIG. 7 shows change in the final command value T determined by the control system of the first embodiment when the steering angle $\theta$ is varied at the vehicle speed V higher than the second speed value $V_2$ ($V > V_2$). In this example, the upper limit value of the first command value $T_1$ is set equal to the upper limit value of the second command value $T_2$. The steering angular speed $|\dot{\theta}|$ is higher than the predetermined value $\dot{\theta}_1$ between $t_1$ and $t_2$, between $t_3$ and $t_4$, and between $t_5$ and $t_6$. During each of these periods, the second command value $T_2$ is set equal to the upper value, and accordingly the moment due to the differential limiting action is held neutral to improve the response of the vehicle.

In this way, the control system of this embodiment improves the response of the vehicle by decreasing the differential limiting force and weakening the undermoment at an initial stage of a rapid steering operation in which the steering angular speed is higher than the predetermined value, and the vehicle speed is higher than the predetermined value. Then, the control system prevents a decrease of the cornering performance by increasing the differential limiting force when the steering angular speed decrease below the predetermined value.

Figure 8:
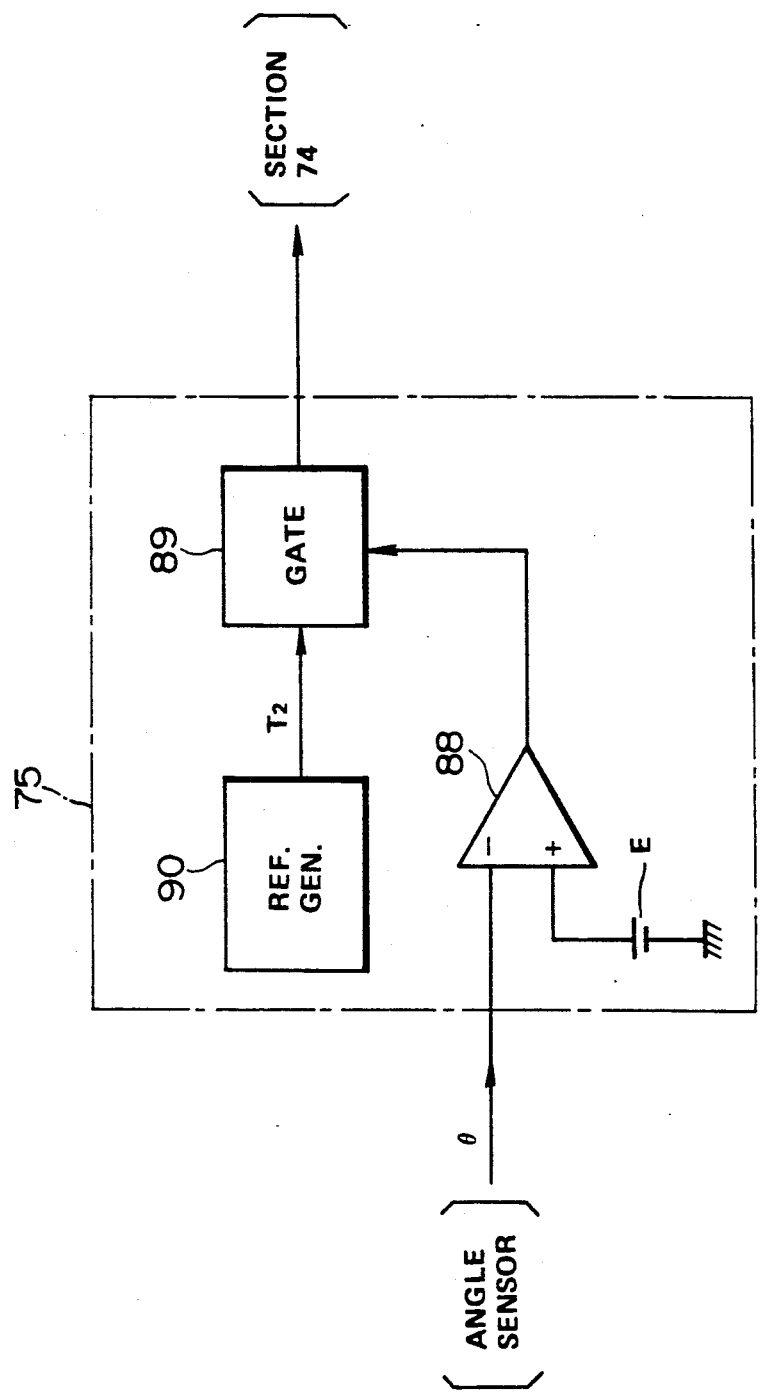
FIG. 8 is a block diagram showing an important portion of a control system of a second embodiment of the present invention.
Figure 9:
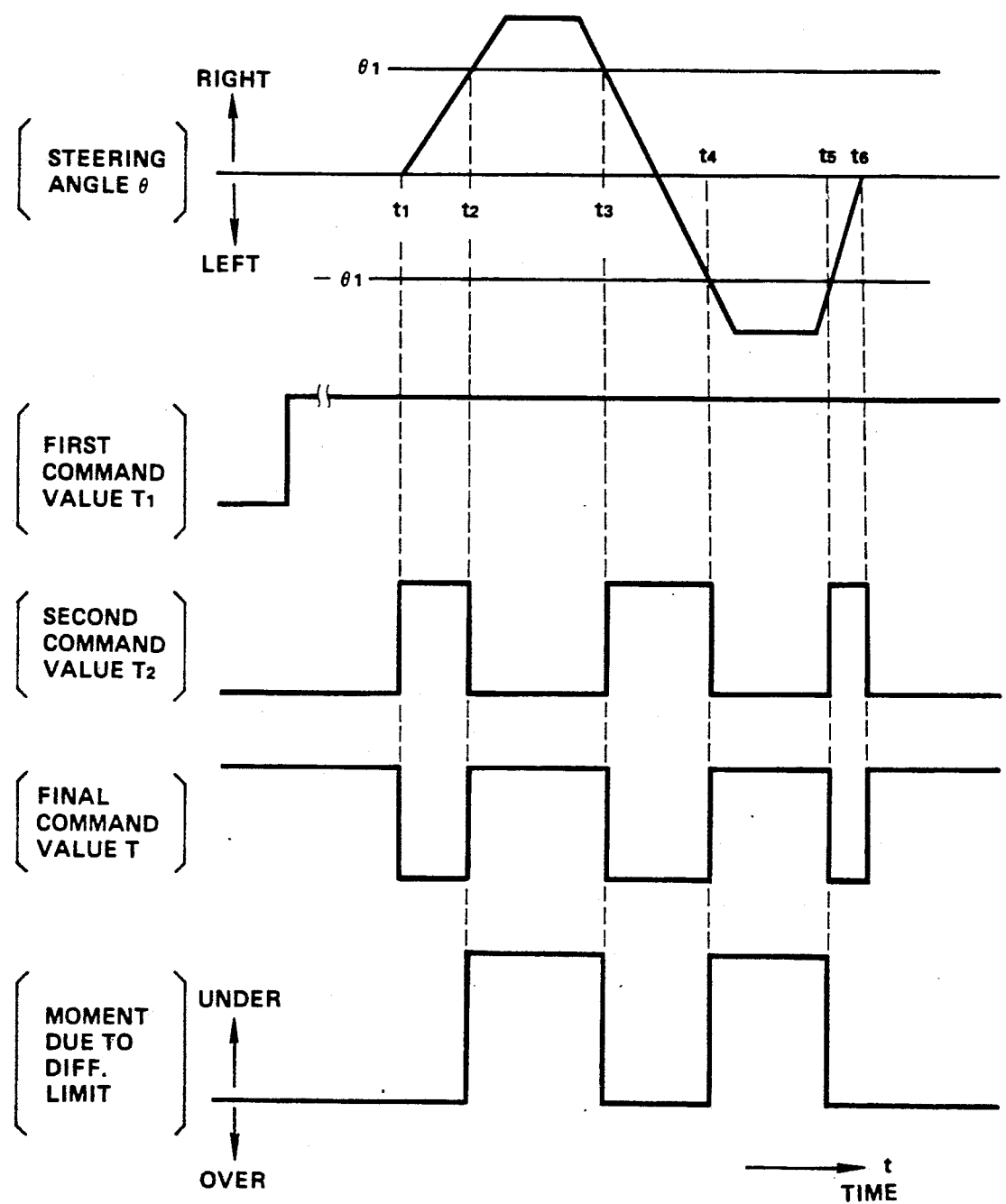
FIG. 9 is a time chart showing operations of control system of the second embodiment.

A second embodiment of the present invention is shown in FIGS. 8 and 9. A control system of the second embodiment is arranged to detect the steering condition by directly using the steering angle 0. In the second embodiment, the command value adjusting section 75 of the controller 20 is arranged as shown in FIG. 8. The control system of the second embodiment is difference from that of the first embodiment only in the command value adjusting section 75.

As shown in FIG. 8, the command value adjusting section 75 of the second embodiment has a comparator 88, a gate circuit 89 and a reference generator 90. The steering angle signal $\theta$ of the steering angle sensor 70 is inputted to an inverting input terminal of the comparator 88. A noninverting input terminal of the comparator 88 is connected with a source of a reference voltage E corresponding to a predetermined reference steering angle value $\theta_1$. An output terminal of the comparator 88 is connected to a control terminal of the gate circuit 89. When the output of the comparator 88 is equal to the logical value "1", then the gate circuit 89 is in an open state. When the output of the comparator 88 is equal to the logical value "0", then the gate circuit 89 is in a closed state. An input terminal of the gate circuit 89 is connected with the reference generator 90, which provides the second command value $T_2$ which is a constant. When the gate circuit 89 is in the open state, the constant second command value $T_2$ is allowed to pass through the gate circuit 89, and reaches the adder 82 of the command value determining section 74 shown in FIG. 2.

In an example shown in FIG. 9 (in which the upper value of $T_1$ is equal to $T_2$), the steering angle $\theta$ is lower than the predetermined steering angle value $\theta_1$, in a period between $t_1$ and $t_2$, a period between $t_3$ and $t_4$, and a period between $t_5$ and $t_6$. During each of these three periods, the output signal of the comparator 88 is equal to the logical value "1", and the gate circuit 89 is in the open state to allow the passage of the second command value $T_2$. Therefore, the final command value T becomes equal to zero, and the moment due to the differential limiting action becomes neutral. In this way, the control system of the second embodiment also improves the vehicle response at an initial state of a steering operation. When, for example, the steering wheel is turned largely to avoid an obstacle on the road, the control system of the second embodiment gives a preference to the response of the vehicle at an early state at which the steering angle is still small. After that, the control system brings the vehicle to a stable state by producing the undermoment.

Figure 10:
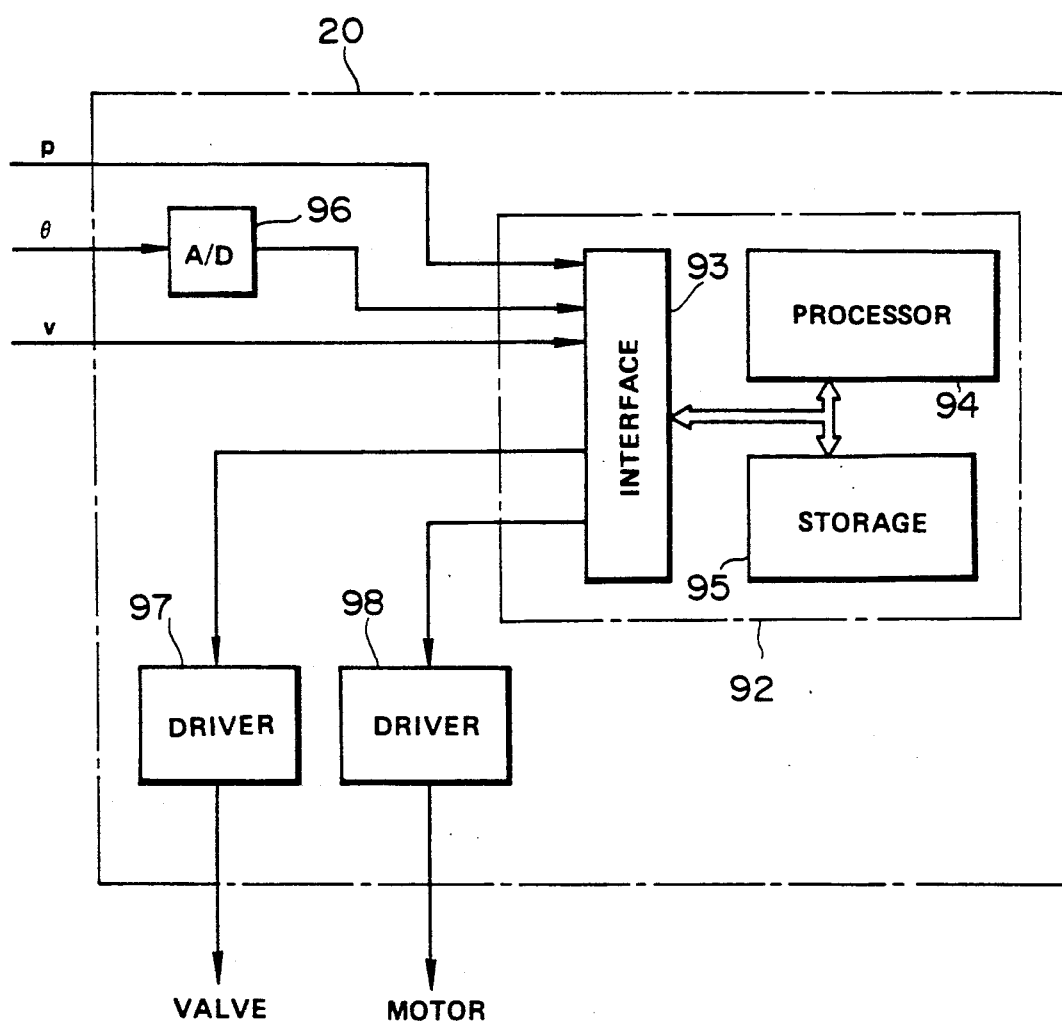
FIG. 10 is a block diagram a main portion of a control system of a third embodiment of the present invention.

A third embodiment of the present invention is shown in FIGS. 10-13. A control system of the third embodiment is arranged to detect the steering condition by using the steering angular speed as in the first embodiment. In the third embodiment, the controller 20 is entirely constituted by a miorcomputer, as shown in FIG. 10.

As shown in FIG. 10, a microcomputer 92 comprises an interface circuit 93, a processing unit 94, and a storage section 95. The pressure signal p, the vehicle speed signal v sent from the vehicle speed sensor 71, and the steering angle signal $\theta$ sent from the steering angle sensor 70 through an A/D converter 96 are inputted into an input port side of the interface circuit 93. An output port side of the interface circuit 93 is connected thorugh a driver circuit 97 to the solenoid of the electromagnetic valve 66 shown in FIG. 2, and through a driver circuit 98 to the motor 60.

The processing unit 94 reads the sensor signals p, v and θ through the interface circuit 93, and processes the signals according to a predetermined program. The storage section 95 stores various data and programs.

In other aspects, the control system of the third embodiment is the same as that of the first embodiment.

Figure 11:
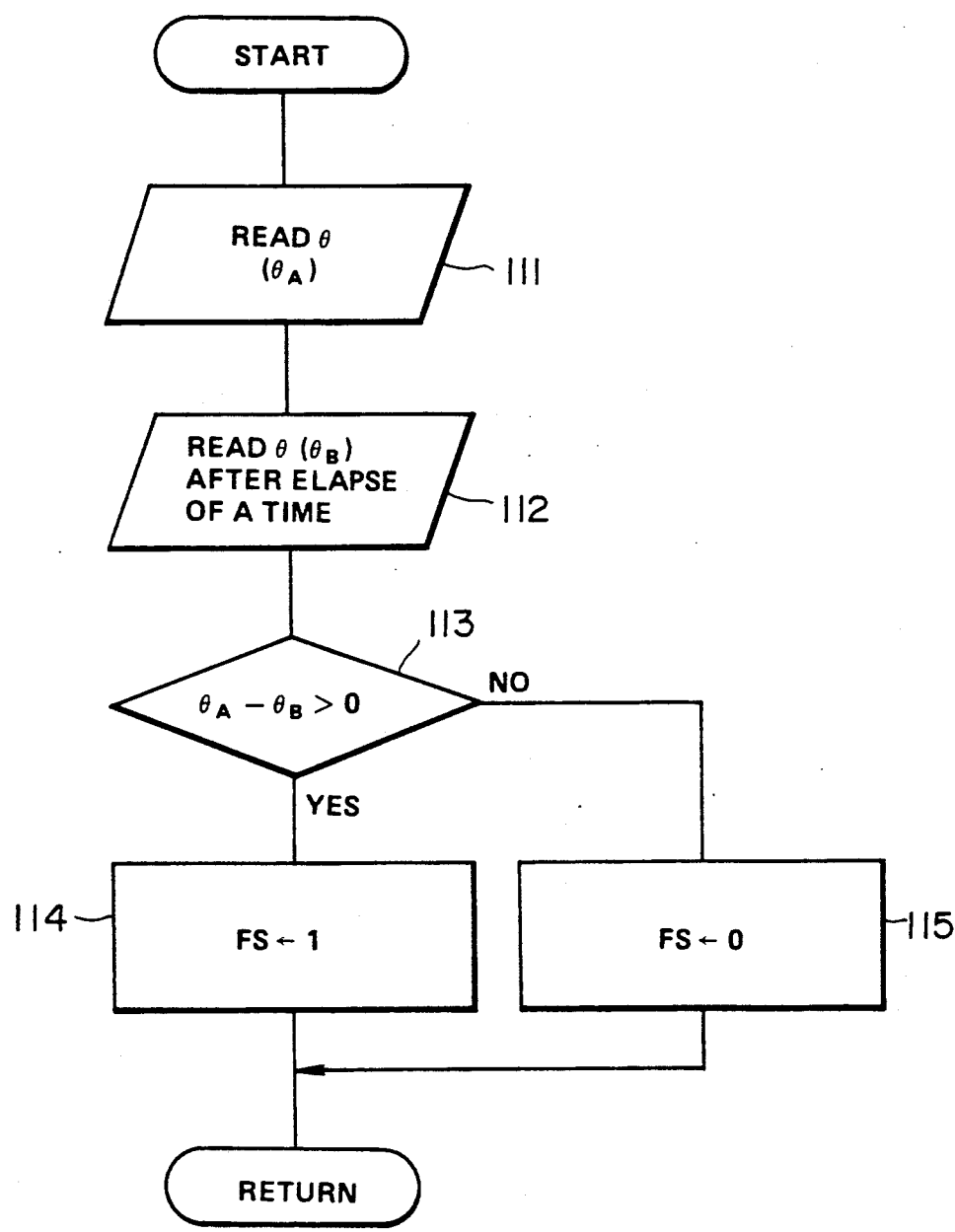
FIGS. 11 and 12 are flowcharts showing timer interrupt routines performed in the third embodiment.
Figure 12:
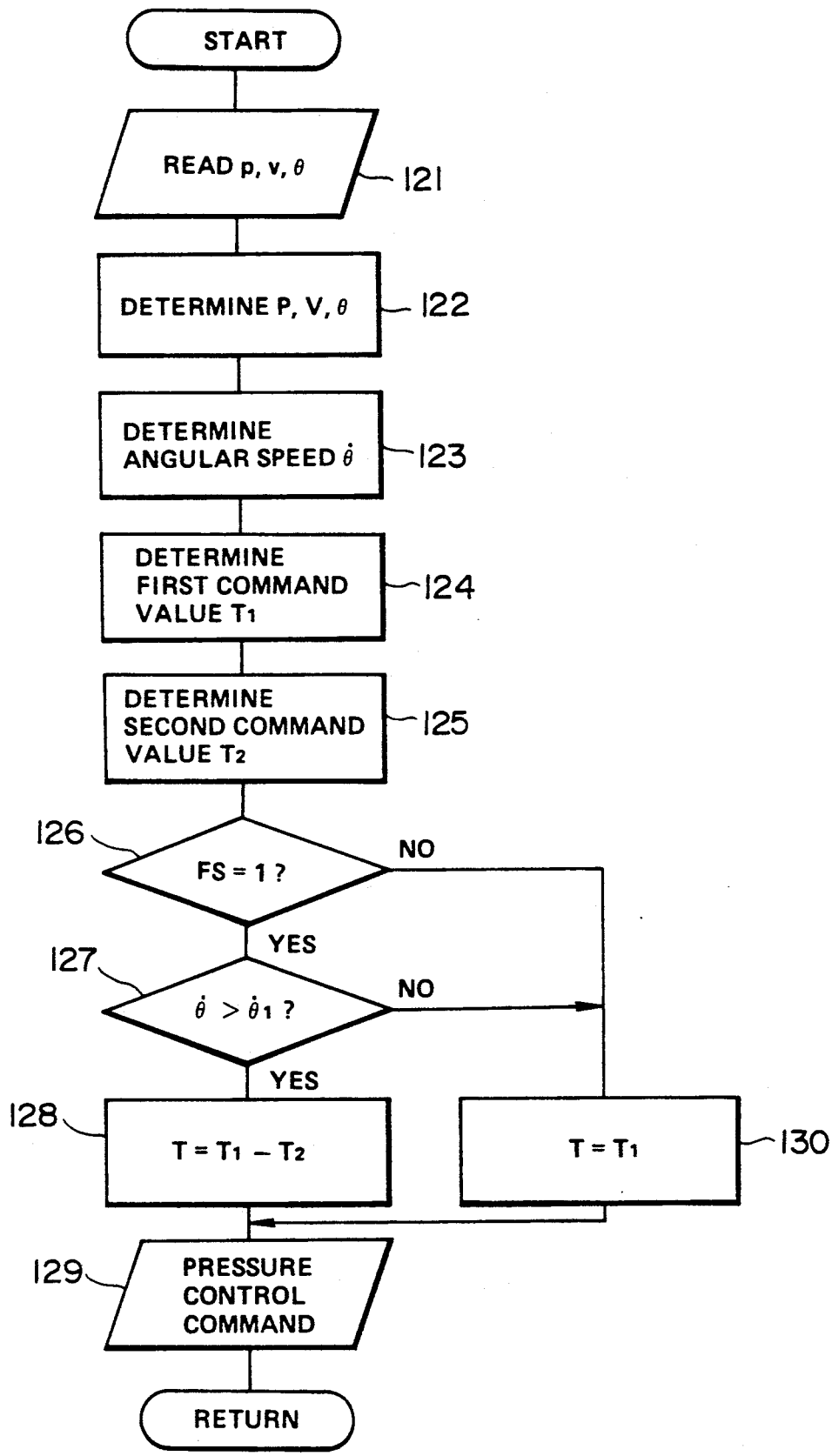

FIGS. 11 and 12 are flowcharts of programs, which are preformed by the controller 20 of the third embodiment at intervals of a predetermined time length (20 msec, for example) as timer interrupt process.

The controller 20 determines whether the steering angle is increasing or not, by using the process of FIG. 11.

At a step 111, the processing unit 94 reads a current value of the digitized steering angle signal θ, and stores that value as $\theta_A$.

At a step 112, the processing unit 94 reads a new value of the digitized steering angle signal θ after the elapse of a predetermined time length, and stores the new value as $\theta_B$.

At a step 113, the processing unit 94 determines whether a difference obtained by subtracting the first value $\theta_A$ from the second value $\theta_B$ is greater than zero ($\theta_B - \theta_A > 0$), or not.

If it is, the processing unit 94 proceeds to a step 114, at which the processing unit 94 sets a flag FS to "1" to indicate a condition that the steering wheel is being turned away from the straight ahead position, and the steering wheel angle is increasing.

If the second value $\theta_B$ is not greater than the first value $\theta_A$, that is the difference $\theta_B - \theta_A$ is equal to or smaller than zero ($\theta_B - \theta_A \leq 0$), then the processing unit 94 proceeds from the step 113 to a step 115, at which the processing unit 94 sets the flag FS to "0" to indicate that the steering angle is not increasing. After the step 114 or 115, the processing unit 94 returns to a main program.

FIG. 12 shows a program for controlling the differential limiting force.

As shown in FIG. 12, the processing unit 94 reads the pressure signal p, the vehicle speed signal v and the steering angle signal θ at a step 121, and determines the oil pressure P, the vehicle speed V and the steering angle θ at a step 122. Then, the processing unit 94 determined the steering angular speed $\dot{\theta}$, that is the time rate of change of the steering wheel angular displacement.

At a step 124, the processing unit 94 determines the first command value $T_1$ corresponding to the vehicle speed V by using a lookup table of functions values determined as shown in FIG. 5. At a step 125, the processing unit 94 determines the second command value $T_2$ corresponding to the steering angular speed $\dot{\theta}$ by using a lookup table corresponding to FIG. 6.

At a step 126, the processing unit 94 determines whether the flag FS is "1" or not. If the steering angle is increasing, and FS=1, then the processing unit 94 proceeds to a step 127 to determine whether the steering angular speed $\dot{\theta}$ is greater than the predetermined angular speed value $\dot{\theta}_1$ ($\dot{\theta} > \dot{\theta}_1$).

If the steering angular speed is greater than the predetermined value $\dot{\theta}_1$, then the processing unit 94 proceeds to a step 128, and determines the final command value T by subtracting the second command value $T_2$ from the first command value $T_1$ ($T = T_1 - T_2$). Thus, the processing unit 94 decreases the final command value T by $T_2$ when the steering wheel is being turned away from the straight ahead position, and at the same time the steering angular speed is greater than the predetermined angular speed value $\dot{\theta}_1$.

At a step 129, the controller 20 makes the output pressure P of the pressure source 18, that is the differential limiting force, equal to a value corresponding to the final command value T, by delivering a motor drive signal and a valve switch signal to the motor 60 and the electromagnetic valve 66 through the driver circuits 97 and 98, respectively in accordance with the final command value T.

If FS=0, or if the steering angular speed $\dot{\theta}$ is equal to or smaller than the predetermined angular speed value $\dot{\theta}_1$, the processing unit 94 proceeds from the step 126 or 127 to a step 130. At the step 130, the processing unit 94 makes the final command value T equal to the first command value $T_1$ regardless of the second command value $T_2$. Then, the processing unit 94 proceeds to the step 129. Thus, the final command value T is set equal to $T_1$ when the steering wheel angle is not increasing, and when the steering wheel angle is increasing but the steering operation is slow.

Figure 13:
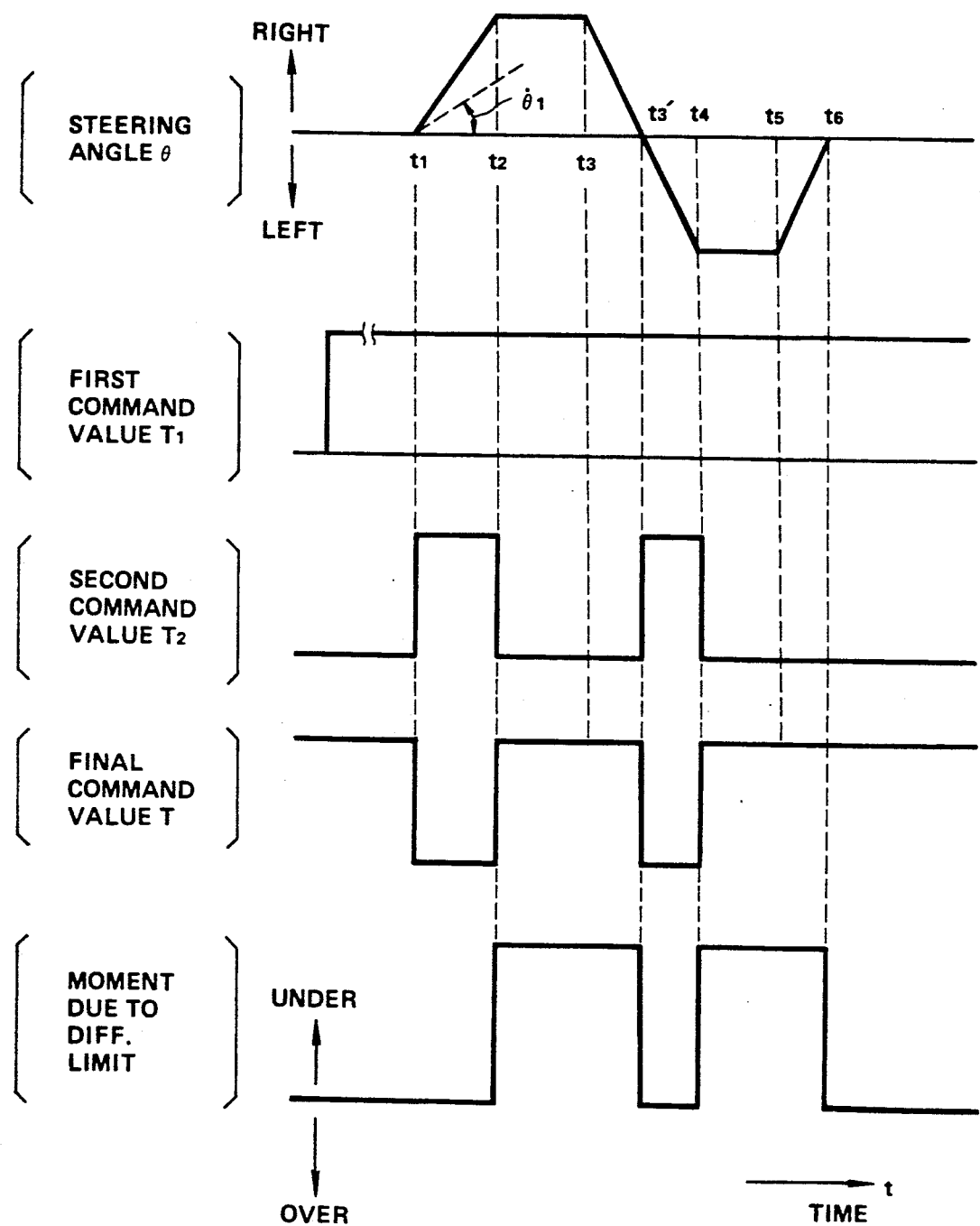
FIG. 13 is a time chart showing operations of the control system of the third embodiment.

FIG. 13 shows operations of the control system of the third embodiment. FIG. 13 is similar to FIG. 7 of the first embodiment, but different in the following point.

During a period between t3 and t3', and a period between t5 and t6, the controller 20 of the third embodiment holds the second command value $T_2$ equal to zero independently of the steering angular speed. When the steering wheel is being returned toward the straight ahead position, the controller 20 of the third embodiment sets the second command value $T_2$ equal to zero even if the steering angular speed is high. During these periods, the central system of the third embodiment improves the response of the vehicle by putting the steering direction (toward the neutral position) and the understeer moment in phase.

In the third embodiment, the vehicle speed sensor 71, and the steps 121 and 122 correspond to the vehicle speed sensing means, and the steering angle sensor 70 and the steps 121–123 correspond to the steering condition sensing means. The steps 124, 128 and 130 correspond to the command value determining means, and the steps 125–127 correspond to the command value adjusting means.

In the first and third embodiments, it is optional to use an angular speed sensor for sensing the steering angular speed.

What is claimed is:

1. A differential limiting force control system for a vehicle, comprising:
   a differential driving mechanism provided between the left and right drive wheels of the vehicle, said differential mechanism comprising means for limiting a differential action in accordance with a control signal;
   means for sensing a vehicle speed of the vehicle and producing a first signal representing said vehicle speed;
   means for sensing a steering condition of the vehicle and producing a second signal representing said steering condition, said steering condition being a steering speed of the vehicle, the steering speed being an angular speed of a steering wheel of the vehicle;
   determining means for determining a command value in accordance with said first signal;
   controlling means for producing said control signal in accordance with said first signal; and decreasing means for decreasing said command value when said steering speed is equal to or greater than a predetermined steering speed value;

wherein said determining means increases said command value when said vehicle speed increases, and said controlling means increases a differential limiting force for limiting the differential action of said differential mechanism by varying said control signal when said vehicle speed increases.

2. A control system according claim 1 wherein said differential limiting means comprises a clutch assembly provided between the left and right drive wheels, and operated by a fluid pressure which is controlled by said control signal.

3. A control system according to claim 1 wherein said steering condition sensing means comprises means for sensing movement of a predetermined movable member of a steering system of the vehicle to determine said steering speed.

4. A control system according to claim 1 wherein said determining means comprises means for producing a first command signal in accordance with said vehicle speed, said decreasing means comprises means for producing a second command signal which is set equal to zero when said steering speed is smaller than said predetermined steering speed value, and which is set equal to a predetermined command value when said steering speed is equal to or greater than said steering speed value, and subtracting means for producing a final command signal by subtracting said second command signal from said first command signal.

5. A control system according to claim 4 wherein said first command signal producing means produces said first command signal so that a magnitude of said first command signal is zero when said vehicle speed is lower than a predetermined first vehicle speed value, increases from zero to a first high value as said vehicle speed increases from said first vehicle speed value to a predetermined second vehicle speed value, and is equal to said first high value when said vehicle speed is higher than said second vehicle speed value.

6. A control system according to claim 5 wherein said steering condition sensing means comprises a steering angle sensor for sensing a steering wheel angle of the steering wheel of the vehicle, and differentiating means for determining said steering speed which is a time derivative of said steering wheel angle.

7. A control system according to claim 1 wherein said decreasing means comprises means for comparing said steering speed with said predetermined steering speed value.

8. A differential limiting force control system for a vehicle, comprising:
a differential driving mechanism provided between the left and right drive wheels of the vehicle, said differential mechanism comprising means for limiting a differential action in accordance with a control signal;
means for sensing a vehicle speed of the vehicle and producing a first signal representing said vehicle speed;
means for sensing a steering condition of the vehicle and producing a second signal representing said steering condition, said steering condition being a steering speed of the vehicle, said steering speed being an angular speed of a steering wheel of the vehicle;

determining means for determining a command value in accordance with said first signal;
controlling means for producing said control signal in accordance with said command value; and
decreasing means for decreasing said command value when said steering speed is equal to or greater than a predetermined steering speed value;
wherein said decreasing means decreases a differential limiting force for limiting the differential action of said differential mechanism by decreasing said command value both when said steering wheel of the vehicle is turned away from a straight ahead position of said steering wheel, and when said steering wheel is returned toward the straight ahead position, as long as said angular speed of said steering wheel is equal to or greater than said predetermined steering speed value.

9. A control system according to claim 8 wherein said steering condition sensing means comprises a steering angle sensor for sensing a steering angle of the vehicle, and differentiating means for determining said steering speed which is a time rate of change of said steering angle, and said decreasing means decreases said differential limiting force when an absolute value of said steering speed is equal to or higher than said predetermined steering speed value.

10. A differential limiting force control system for a vehicle, comprising:
a differential driving mechanism provided between the left and right drive wheels of the vehicle, said differential mechanism comprising means for limiting a differential action in accordance with a control signal;
means for sensing a vehicle speed of the vehicle and producing a first signal representing said vehicle speed;
means for sensing a steering condition of the vehicle and producing a second signal representing said steering condition, said steering condition being a steering speed of the vehicle, the steering speed being an angular speed of a steering wheel of the vehicle;
determining means for determining a command value in accordance with said first signal;
controlling means for producing said control signal in accordance with said command value; and
decreasing means for decreasing said command value when said steering speed is equal to or greater than a predetermined steering speed value;
wherein said decreasing means decreases a differential limiting force for limiting the differential action of said differential mechanism by decreasing said command value only when said steering wheel is turned away from a straight ahead position of said steering wheel, and simultaneously said angular speed of said steering wheel is equal to or greater than said predetermined steering speed value.

11. A control system according to claim 10 wherein said steering condition sensing means comprises a steering angle sensor for sensing a steering wheel angle of said steering wheel, and differentiating means for determining a time rate of change of said steering wheel angle, and said decreasing means comprises discriminating means for determining whether said steering wheel is turned away from said straight ahead position or not, by determining whether said steering wheel angle is increasing or not.

12. A differential limiting force control system for a vehicle, comprising:
- a differential driving mechanism provided between the left and right drive wheels of the vehicle, said differential mechanism comprising means for limiting a differential action in accordance with a control signal;
- means for sensing a vehicle speed of the vehicle and producing a first signal representing said vehicle speed;
- means for sensing a steering condition of the vehicle and producing a second signal representing said steering condition, said steering condition being a steering speed of the vehicle, said steering speed being an angular speed of a steering wheel of the vehicle;
- determining means for determining a command value in accordance with said first signal;
- controlling means for producing said control signal in accordance with said command value; and
- decreasing means for decreasing said command value when said steering speed is equal to or greater than a predetermined steering speed value;
- wherein said decreasing means decreases a differential limiting force for limiting the differential action of said differential mechanism by decreasing said command value only when a steering wheel angle of said steering wheel is equal to or smaller than a predetermined steering angle value.

13. A differential limiting force control system for a vehicle, comprising:
- a differential driving mechanism provided between the left and right drive wheels of the vehicle, said differential mechanism comprising means for limiting a differential action in accordance with a control signal;
- means for sensing a vehicle speed of the vehicle and producing a first signal representing said vehicle speed;
- means for sensing a steering condition of the vehicle and producing a second signal representing said steering condition, said steering condition being a steering speed of the vehicle;
- determining means for determining a command value in accordance with said first signal;
- controlling means for producing said control signal in accordance with said command value; and
- decreasing means for decreasing said command value when said steering speed is equal to or greater than a predetermined steering speed value;
- wherein said determining means includes means for decreasing said command value with a decrease in said vehicle speed even when the steering angle of said vehicle is held equal to zero, to drive the vehicle straight, said controlling means includes means for decreasing a differential limiting force for limiting the differential action of said differential mechanism with a decrease in said vehicle speed by varying said control signal even when the steering angle of said vehicle is held equal to zero, to drive said vehicle straight.

14. A differential limiting force control system for a vehicle, comprising:
- a differential mechanism provided between the left and right drive wheels of the vehicle, said differential mechanism comprising means for limiting a differential action in accordance with a control signal;
- means for sensing a speed of the vehicle and producing a first signal representing said vehicle speed;
- means for sensing a steering condition of the vehicle and producing a second signal representing said steering condition, said steering condition being a steering speed of the vehicle, the steering condition sensing means comprising a steering angle sensor for sensing a steering wheel angle of the vehicle;
- determining means for determining a command value in accordance with said first signal, the determining means comprising a first function generating means for producing a first command signal whose magnitude is zero when said vehicle speed is lower than a predetermined first vehicle speed value, and which increases from zero to a first high value as said vehicle speed increases from said first vehicle speed value to a second vehicle speed value, and is equal to said first high value when said vehicle speed is higher than said second vehicle speed value, said determining means further comprising means for producing a final command signal whose magnitude is equal to a difference obtained by subtracting the magnitude of said second command signal from the magnitude of said first command signal;
- controlling means for producing said control signal in accordance with said command value; and
- decreasing means for decreasing said command value when said steering speed is equal to or greater than a predetermined steering speed value, the decreasing means comprising differentiating means for determining a time derivative of said steering wheel angle, means for determining an absolute value of said time derivative and second function generating means for producing a second command signal whose magnitude is zero when said absolute value of said time derivative is smaller than a predetermined angular speed value, and is equal to a second high value when said absolute value of said time derivative is higher than said predetermined angular speed value.

15. A differential limiting force control system for a vehicle, comprising:
- a differential mechanism provided between the left and right drive wheels of the vehicle, said differential mechanism comprising means for limiting a differential action in accordance with a control signal;
- means for sensing a speed of the vehicle and producing a first signal representing the speed of said vehicle;
- means for sensing a steering condition of said vehicle and producing a second signal representing said steering condition, said steering condition being a steering speed of the vehicle; said steering condition sensing means comprising a steering angle sensor for sensing a steering wheel angle of the vehicle;
- determining means for determining a command value in accordance with said first signal, said determining means comprising first function generating means for producing a first command signal whose magnitude is zero when said vehicle speed is lower than a predetermined first vehicle speed value and increase from zero to a first high value as said vehicle speed increases from said first vehicle speed value to a second vehicle speed value and is equal to said higher value when said vehicle speed is higher than said second vehicle speed value, said determining means further including means for producing a final command signal whose magnitude is equal to a difference obtained by subtracting the magnitude of the second command signal from the magnitude of the first command signal;

controlling means for producing said control signal in accordance with said command value; and decreasing means for decreasing said command value when said steering speed is equal to or greater than a predetermined steering speed value, said decreasing means comprising comparing means for comparing said steering wheel angle with a predetermined angle value and means for producing a second command signal whose magnitude is zero when said steering wheel angle is equal to or lower than said predetermined angle value, and equal to a second high value when said steering wheel angle is higher than said predetermined angle value.

16. A differential limiting force control system for a vehicle, comprising;

a differential mechanism between the left and right drive wheels of the vehicle, said differential mechanism comprising means for limiting a differential action in accordance with a control signal;

means for sensing a speed of the vehicle and producing a first signal representing said vehicle speed;

means for sensing a steering condition of the vehicle and producing a second signal representing said steering condition, said steering condition being a steering speed of said vehicle, said steering condition sensing means further including a steering angle sensor for sensing a steering wheel angle of the vehicle;

determining means for determining a command value in accordance with the first signal, said determining means including a first function generating means for producing a first command signal whose magnitude is zero when said vehicle speed is lower than a predetermined first vehicle speed value, increases from zero to a first high value as said vehicle speed increases from said first vehicle speed value to a second vehicle speed value, and is held equal to said first high value when said vehicle speed is higher than said second vehicle speed value;

controlling means for producing said control signal in accordance with said command value; and decreasing means for decreasing said command value when said steering speed is equal to or greater than a predetermined steering speed value, said decreasing means further including differentiating means for determining a time derivative of said steering wheel angle, discriminating means for determining if said steering wheel angle is increasing, and second function generating means for producing a second command signal whose magnitude is normally equal to a second high value only when said steering angle is increasing and at the same time said time derivative of said steering wheel angle is higher than a predetermined value.

* * * * *